(12) United States Patent
Wilson et al.

(10) Patent No.: US 8,528,611 B2
(45) Date of Patent: Sep. 10, 2013

(54) TIRE INFLATION SYSTEM WITH PARALLEL PUMP

(75) Inventors: Matt J. Wilson, Canal Fulton, OH (US); Phillippi R. Pierce, Canton, OH (US); Matthew VanMeter, Cuyahoga Falls, OH (US); Santo Padula, Medina, OH (US); Michael J. Keeler, Naperville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 12/566,960

(22) Filed: Sep. 25, 2009

(65) Prior Publication Data

US 2010/0078109 A1    Apr. 1, 2010

Related U.S. Application Data

(60) Provisional application No. 61/100,336, filed on Sep. 26, 2008.

(51) Int. Cl.
*B60C 23/10* (2006.01)
(52) U.S. Cl.
USPC ............................................. 152/416; 152/419
(58) Field of Classification Search
USPC .......................... 152/415, 416, 417, 418, 419
See application file for complete search history.

(56) References Cited

U.S. PATENT DOCUMENTS

| | | | | |
|---|---|---|---|---|
| 4,256,160 A | * | 3/1981 | More | 152/427 |
| 4,763,709 A | * | 8/1988 | Scholer | 152/416 |
| 6,269,691 B1 | * | 8/2001 | Sowatzke et al. | 73/146.2 |
| 7,273,082 B2 | * | 9/2007 | White et al. | 152/417 |
| 7,963,307 B2 | * | 6/2011 | Rudolf et al. | 152/416 |
| 2005/0194080 A1 | | 9/2005 | White et al. | |
| 2006/0180256 A1 | * | 8/2006 | Mittal | 152/416 |
| 2009/0084481 A1 | * | 4/2009 | Kalavitz | 152/417 |

FOREIGN PATENT DOCUMENTS

| | | |
|---|---|---|
| DE | 10360730 A1 | 7/2005 |
| EP | 0166123 A | 1/1986 |
| EP | 1265761 B1 | 8/2004 |
| WO | 9801310 A | 1/1998 |
| WO | 9958353 A | 11/1999 |
| WO | 0102196 A | 1/2001 |
| WO | 2008001873 A | 1/2008 |

* cited by examiner

*Primary Examiner* — Kip T Kotter
(74) *Attorney, Agent, or Firm* — Dureska, Kennedy & Moore, LLC; David P. Dureska; Edward T. Kennedy

(57) ABSTRACT

A vehicle tire inflation system includes an air supply that is connected to a vehicle tire by a pneumatic conduit. A pump that is independent of and pneumatically parallel to the vehicle air supply includes an inlet and an outlet. The pump inlet receives air from atmosphere, the pump compresses the air, and the pump outlet is fluidly connected to the pneumatic conduit. When the air pressure in the pneumatic conduit drops below a predetermined level, compressed air from the pump is introduced into the pneumatic conduit, thus increasing the air pressure in the conduit to increase the air pressure that is available to the tire. A reservoir tank, which is also independent of the vehicle air supply, may be in fluid communication with the pump outlet and the pneumatic conduit.

26 Claims, 8 Drawing Sheets

TIRE INFLATION SYSTEM WITH PARALLEL PUMP

CROSS-REFERENCE TO RELATED APPLICATIONS

This application claims the benefit of U.S. Provisional Patent Application Ser. No. 61/100,336, which was filed on Sep. 26, 2008.

BACKGROUND OF THE INVENTION

1. Technical Field

The invention relates to the art of tire inflation systems. More particularly, the invention relates to tire inflation systems for heavy-duty vehicles such as tractor-trailers or semi-trailers, which can operate as the vehicles are moving. Still more particularly, the invention is directed to a tire inflation system which incorporates an electrical or mechanical pump that increases the air pressure that is available to the tire inflation system, and in which the pump is connected to the tire inflation system in a manner that is separate from and pneumatically parallel to the vehicle air supply, thereby enabling the pump to operate independently of the vehicle air supply.

2. Background Art

All tractor-trailers include at least one trailer, and sometimes two or three trailers, all of which are pulled by a single tractor. Each trailer typically includes multiple tires, each of which is inflated with air to a recommended pressure. However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not under-inflated. Should an air check show that a tire is under-inflated, it is desirable to enable air to flow into the tire to return it to an optimum tire pressure.

The large number of tires on any given trailer setup makes it difficult to manually check and maintain the optimum tire pressure for each and every tire. This difficulty is compounded by the fact that multiple trailers in a fleet may be located at a site for an extended period of time, during which the tire pressure might not be checked. Any one of these trailers might be placed into service at a moment's notice, leading to the possibility of operation with under-inflated tires. Such operation may increase the chance of failure of a tire in service as compared to operation with tires in an optimum inflation range.

Moreover, should a tire develop a leak, for example, as a result of striking a road hazard, the tire could fail if the leak continues unabated as the vehicle travels over-the-road. The potential for tire failure often is more pronounced in vehicles such as tractor-trailers that travel for long distances and/or extended periods of time.

Such a need to maintain optimum tire pressure, and the inconvenience to the vehicle operator to manually check and maintain proper tire pressure, led to the development of prior art systems that attempt to automatically monitor the pressure in a vehicle tire and/or inflate the vehicle tire with air to a desired tire pressure as the vehicle is moving. An exemplary tire inflation system of the prior art is shown and described in U.S. Pat. No. 7,273,082, which is owned by the assignee of the present invention, Hendrickson USA, L.L.C.

Prior art tire inflation systems generally involve providing air from the air supply of the vehicle to the vehicle tires using a variety of different structures, arrangements and/or methods. While being satisfactory for their intended functions, tire inflation systems of the prior art may experience disadvantages in certain situations. More particularly, in some systems, the air pressure that is required to inflate a tire may be greater than the pressure capacity of the vehicle air supply. This situation is sometimes experienced in geographic areas such as Europe, where tires with higher inflation pressures are often employed. As a result, in cases where the air pressure that is required for the tire, and thus the tire inflation system, is greater than the pressure capacity of the vehicle air supply, it is necessary to increase the pneumatic pressure that is available to the tire inflation system.

A prior art solution to the need to increase the pressure for the tire inflation system has been to provide an in-line booster pump. More specifically, in such a system, the inlet of a booster pump is connected to the outlet of the vehicle air supply. The booster pump thus takes the compressed air from the vehicle supply and boosts the pressure of the air from the vehicle supply to a higher level. Such a system is considered to be an in-line system, because the inlet of the booster pump is pneumatically in-line with and is connected to the vehicle air supply.

While the prior art in-line booster pump system does increase the air pressure that is available to the tire inflation system, it possesses certain disadvantages. For example, the in-line booster pump depends on the vehicle air supply, since the pump does not provide an independent source of air. Thus, if there is a malfunction of components associated with the vehicle air supply, the booster pump is not independently able to provide air to the tire inflation system. Also, since the in-line booster pump is located directly between the vehicle air supply and the remainder of the tire inflation system, a malfunction of the booster pump may undesirably block or otherwise affect the supply of air to the tire inflation system from the vehicle air supply. Moreover, since the in-line booster pump is located directly in-line with the vehicle air supply and other tire inflation system components, a significant amount of time may undesirably be required to disassemble and reassemble system components when it is necessary to service or replace the booster pump. In addition, in the event of failure of the in-line booster pump under conditions in which proper servicing and/or replacement of the booster pump is not available, it may be inconvenient and/or expensive to bypass the pump.

As a result, there is a need in the art for a tire inflation system that provides a pump or compressor which is pneumatically separate from and parallel to the vehicle air supply, rather than being pneumatically in-line with the vehicle air supply. Such a pneumatically parallel pump should operate independently from the vehicle air supply, thereby enabling: the pump to provide air to the tire inflation system in the event that components associated with the vehicle air supply malfunction; the vehicle air supply to provide air to the tire inflation system in the event of malfunction of the pump; easy servicing and/or replacement of the pump; and easy bypassing of the pump, in the event that such a bypass is needed. The tire inflation system with parallel pump of the present invention satisfies this need, as will be described in detail below.

BRIEF SUMMARY OF THE INVENTION

An objective of the present invention is to provide a tire inflation system with a pump that operates independently from the vehicle air supply.

Another objective of the present invention is to provide a tire inflation system with a pump that is capable of providing air to the tire inflation system in the event that components associated with the vehicle air supply malfunction.

Yet another objective of the present invention is to provide a tire inflation system with a pump that enables the vehicle air supply to provide air to the tire inflation system in the event of malfunction of the pump.

Still another objective of the present invention is to provide a tire inflation system with a pump that enables easy servicing, replacement and/or bypassing of the pump, as needed.

These objectives and others are obtained by the tire inflation system of the present invention. In an exemplary embodiment of the invention, an air supply source is in fluid communication with a tire of a vehicle. A pneumatic conduit extends between and is in fluid communication with the air supply source and the tire. A pump includes an inlet and an outlet. The pump inlet receives air from atmosphere, the pump compresses the air, and the outlet is in fluid communication with the pneumatic conduit independent of the air supply source. Means actuate the pump to increase an air pressure in the pneumatic conduit.

BRIEF DESCRIPTION OF THE SEVERAL VIEWS OF THE DRAWINGS

The preferred embodiments of the present invention, illustrative of the best mode in which Applicants have contemplated applying the principles, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

Figure 1:
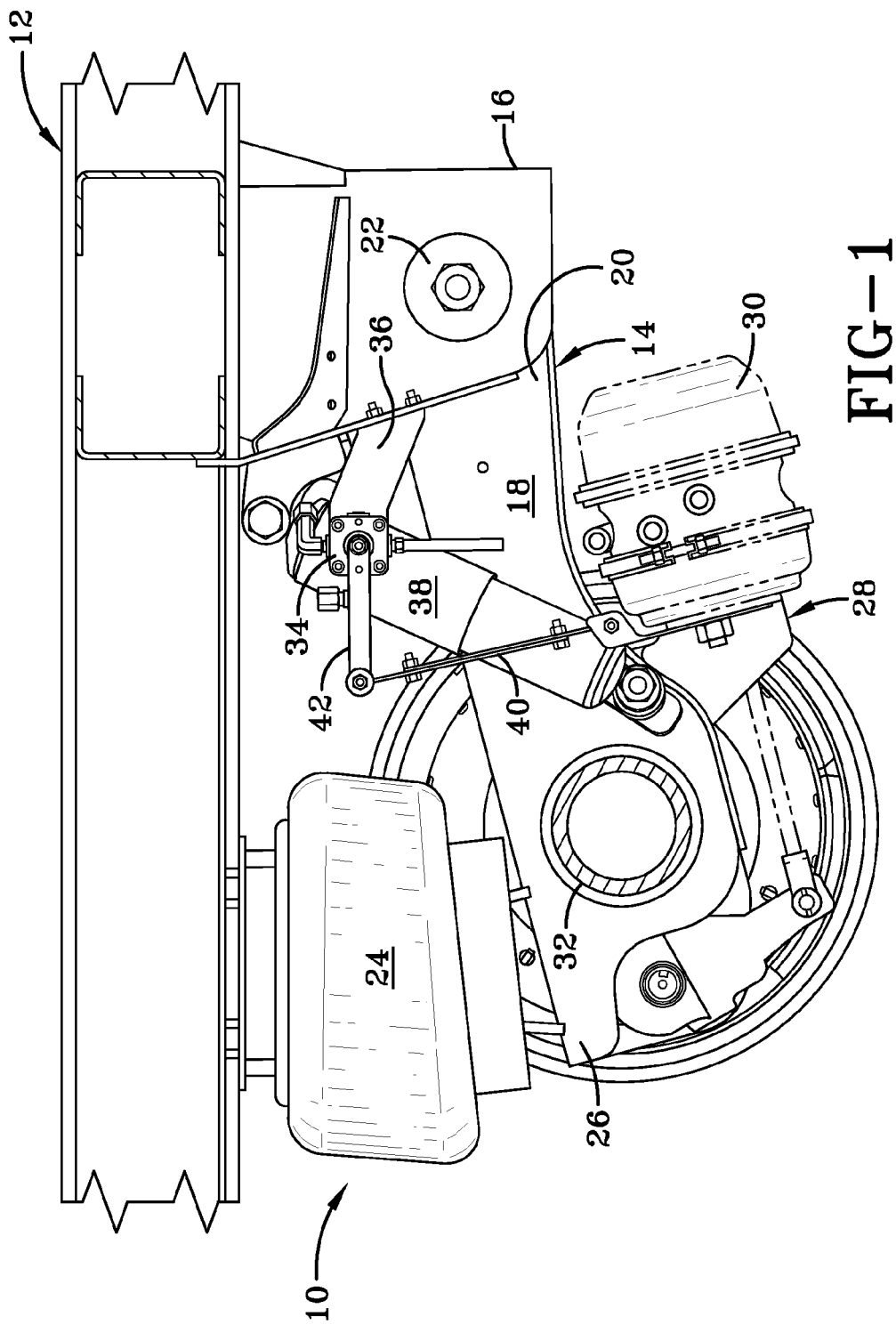
FIG. 1 is a fragmentary side elevational view, with portions in section, of a prior art suspension assembly and an axle of an air-ride trailing arm beam-type axle/suspension system, shown depending from a heavy-duty vehicle frame, and further showing brake components.

So that the structure, operation, and advantages of the tire inflation system with parallel pump of the present invention can be best understood, an exemplary environment in which it operates is shown in FIG. 1 and now will be described. An air-ride axle/suspension system is indicated generally at 10 and is mounted on a heavy-duty vehicle frame 12. It is to be noted that prior art air-ride axle/suspension system 10, while shown as including a specific type of trailing arm suspension assembly 14 and a specific type of axle 32, also includes other types of heavy-duty vehicle air-ride and non-air-ride suspension assemblies known to those skilled in the art, such as other types of trailing arm and leading arm air-ride suspension assemblies and mechanical spring suspension assemblies, and other axles known to those skilled in the art. It is also to be noted that vehicle frame 12 is generally representative of various types of frames used for heavy-duty vehicles, including primary frames that do not support a subframe, and primary frames and/or floor structures that do support a non-movable or movable subframe.

Axle/suspension system 10 includes a pair of generally identical suspension assemblies 14 each suspended from a respective one of a pair of transversely-spaced frame hangers 16. Each hanger 16 is secured to and depends from frame 12 of the heavy-duty vehicle. Inasmuch as suspension assemblies 14 are identical, only one will be described hereinbelow and shown in FIG. 1. Suspension assembly 14 includes a trailing arm-type suspension beam 18 which is pivotally mounted at its front end 20 on hanger 16 in a usual manner through the use of a suitable pivot and bushing assembly 22. An air spring 24 is suitably mounted on and extends between the upper surface of a rear end 26 of suspension beam 18 and frame 12. A shock absorber 38 also typically is mounted on and extends between beam 18 and frame 12. A brake chamber 30 and other components of a brake system 28 are shown attached to beam 18 by way of example, as it is to be understood that other arrangements for attaching components of the brake system to axle/suspension system 10 are known in the art. Axle 32 extends between and is captured in the pair of suspension beams 18, and one or more wheels 46 (FIG. 2) are mounted on each end of the axle, with tires 44 (FIG. 2) in turn being mounted on the wheels as known in the art.

A height control valve 34 is shown mounted on hanger 16 via a bracket 36, and includes a control arm 42 that is able to move upwardly and downwardly to activate the valve. A mechanical linkage 40 is mounted on beam 18 and is operatively connected to control arm 42 of height control valve 34.

Figure 2:
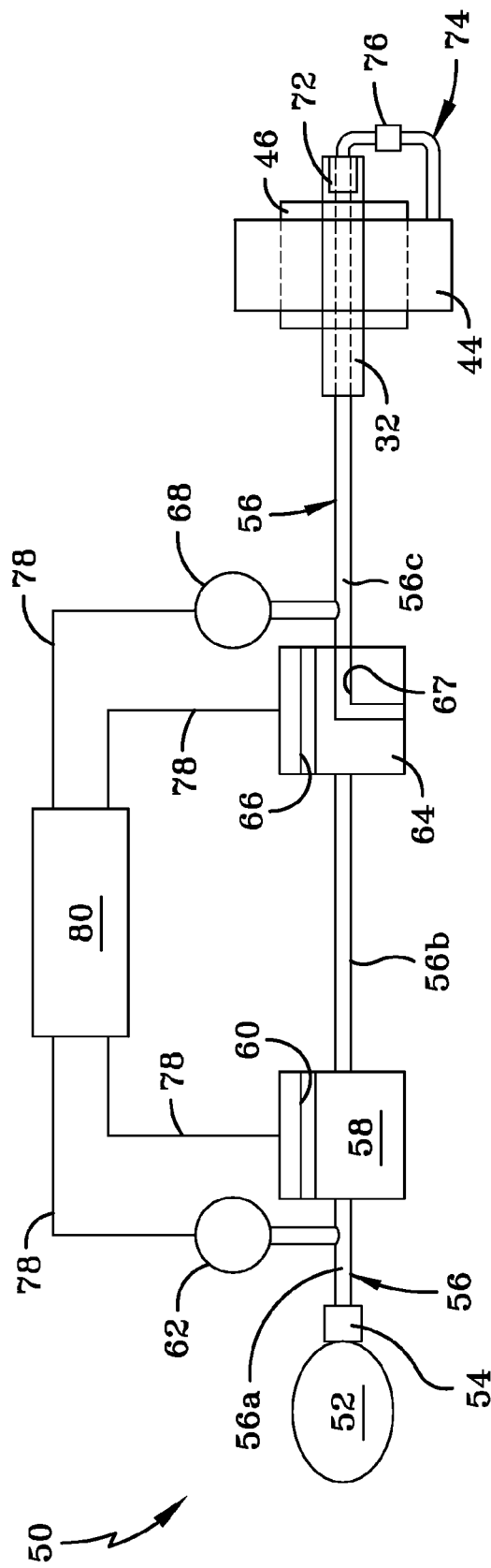
FIG. 2 is a schematic diagram of the main components of an exemplary electronically-regulated prior art tire inflation system.

For further understanding of the operation and advantages of the tire inflation system with parallel pump of the present invention, an exemplary electronically-regulated prior art tire inflation system for use with axle/suspension system 10 is shown in FIG. 2 and now will be described. Exemplary prior art tire inflation system is indicated generally at 50 and is schematically shown. While the structure and operation of exemplary prior art tire inflation system 50 is further shown and described in U.S. Pat. No. 7,273,082, which is owned by the assignee of the present invention, Hendrickson USA, L.L.C., it is to be understood that the exemplary electronically-regulated prior art tire inflation system is shown only by way of example, as the present invention finds use with any known electronically-regulated, mechanically-regulated or pneumatically-regulated tire inflation system.

As an electronically-regulated system, tire inflation system 50 is a pneumatic system with electronic control and includes a vehicle air supply or source 52 of pressurized or compressed air. Vehicle air supply 52 typically is a main reservoir tank and will be referred to hereinbelow for the purpose of convenience as a supply tank. In vehicles that are used in certain geographic areas, such as the U.S., supply tank 52 optimally is charged with compressed or pressurized air to about 120 pounds per square inch (psi) or about 8.3 bar. In vehicles that are used in certain other geographic areas, such as Europe, the maximum pressure level of supply tank 52 is often set by government regulations at about 100 psi or about 7 bar, and to ensure compliance with such regulations, the supply tank is often charged by vehicle operators to a lower level, such as about 90 psi or just over 6 bar. Supply tank 52 is connected, by components to be described in detail below, to vehicle tires 44. For the purpose of convenience, only a single tire 44 is illustrated in FIG. 2, but it is to be understood that tire inflation system 50 typically is utilized with multiple tires.

A pneumatic conduit 56 extends between and interconnects components of inflation system 50. More particularly, a first pneumatic conduit section 56a extends between and fluidly connects supply tank 52 via a pressure protection valve 54 to a supply valve 58. Supply valve 58 may be of any type that is well-known in the art, and preferably is a solenoid valve. Supply valve 58 includes a channel 60 that facilitates the transfer of air through the supply valve when the valve is energized or open. Thus, when supply valve 58 is energized, channel 60 aligns with and is fluidly connected with first conduit section 56a and air passes through the valve, effectively moving from supply tank 52 through pressure protection valve 54 to the remaining components of tire inflation system 50. When supply valve 58 is de-energized, that is, in a closed position as shown in FIG. 2, no air passes from first conduit section 56a through the supply valve. A supply pressure transducer 62 is fluidly connected to first pneumatic conduit section 56a to measure the air pressure between supply tank 52/pressure protection valve 54 and supply valve 58, which is referred to as the supply pressure.

When supply valve 58 is energized, pressurized air passes through it to a second pneumatic conduit section 56b and to a delivery valve 64, which in turn is pneumatically connected to a third pneumatic conduit section 56c. As with supply valve 58, delivery valve 64 may be of any type that is well-known in the art, and preferably is a solenoid valve. Delivery valve 64 includes a first channel 66 that aligns with second pneumatic conduit section 56b and third pneumatic conduit section 56c to facilitate the transfer of air through the delivery valve when the valve is energized or open. Delivery valve 64 also includes a second channel 67, also referred to as a vent channel, which aligns with third pneumatic conduit section 56c when the delivery valve is de-energized, or closed, to vent that section to the atmosphere, as shown in FIG. 2. A delivery pressure transducer 68 is fluidly connected to third pneumatic conduit section 56c to measure the air pressure in that conduit section, which is referred to as the delivery pressure.

After pressurized air passes through delivery valve 64 when the delivery valve is energized, it proceeds through third pneumatic conduit section 56c, which passes through vehicle axle 32, on which wheel 46, including tire 44, is rotatably mounted in a usual manner. A rotary union 72 is mounted on an outboard end of axle 32 as known to those skilled in the art, and facilitates fluid communication between third pneumatic conduit section 56c and an air tube assembly 74, which in turn fluidly connects to tire 44. A tire pressure retention valve 76, which preferably is a check valve, is biased to a closed position when the air pressure in tire 44 is higher than the air pressure in third pneumatic conduit 56c to isolate each tire from the rest of tire inflation system 50, including other tires. Thus, air passes from supply tank 52 via pressure protection valve 54 through supply valve 58, delivery valve 64 and axle 32 via pneumatic conduit 56 to arrive at rotary union 72, where it passes through air tube assembly 74, and into tire 44.

To monitor and control tire inflation system 50, solenoid valves 58, 64 and pressure transducers 62, 68 are electrically connected via wires 78 or by other means known in the art, such as fiber-optic cable, coaxial cable, radio frequency and the like, to an electronic control unit 80. It is important to note that, as mentioned above, tire inflation system 50 typically includes a plurality of tires 44, which are often mounted on opposing ends of multiple of axles 32 via respective wheels 46. To deliver pressurized air to each tire 44, third pneumatic conduit section 56c branches off, with each branch extending through a respective selected axle 32. In addition, more than one tire 44 may be mounted on one end of axle 32. It is to be understood that electronically-regulated prior art tire inflation system 50 is shown only by way of example, as the present invention finds use with any known electronically-regulated, mechanically-regulated or pneumatically-regulated tire inflation system.

As mentioned above, in some geographic areas such as Europe, tires 44 with higher inflation pressures are often employed, which require an air pressure that may be greater than the pressure capacity of supply tank 52. As a result, it is necessary to provide tire inflation system 50 with means to increase the pressure of the air to tires 44. The prior art solution for increasing the pressure of tire inflation system 50, that is, the in-line booster pump, includes certain disadvantages, as described above.

More particularly, since the in-line booster pump of the prior art is directly pneumatically connected to supply tank 52, it is dependent upon the supply tank, which prevents the in-line booster pump from providing air to tire inflation system 50 if there is a malfunction of the supply tank. In addition, a malfunction of the in-line booster pump may undesirably block the supply of air from supply tank 52 to tire inflation system 50, and if it is necessary to service or replace the in-line booster pump, a significant amount of time may undesirably be required to disassemble and reassemble system components due to the in-line booster pump being connected to the air supply tank. Moreover, if it is necessary to bypass the in-line booster pump, such a bypass may be inconvenient and/or expensive. As a result, there is a need in the art for a tire inflation system that provides a pump that is not connected to, and thus is able to operate independently of, vehicle air supply 52. The tire inflation system with parallel pump of the present invention provides such a system, as will now be described.

Figure 3:
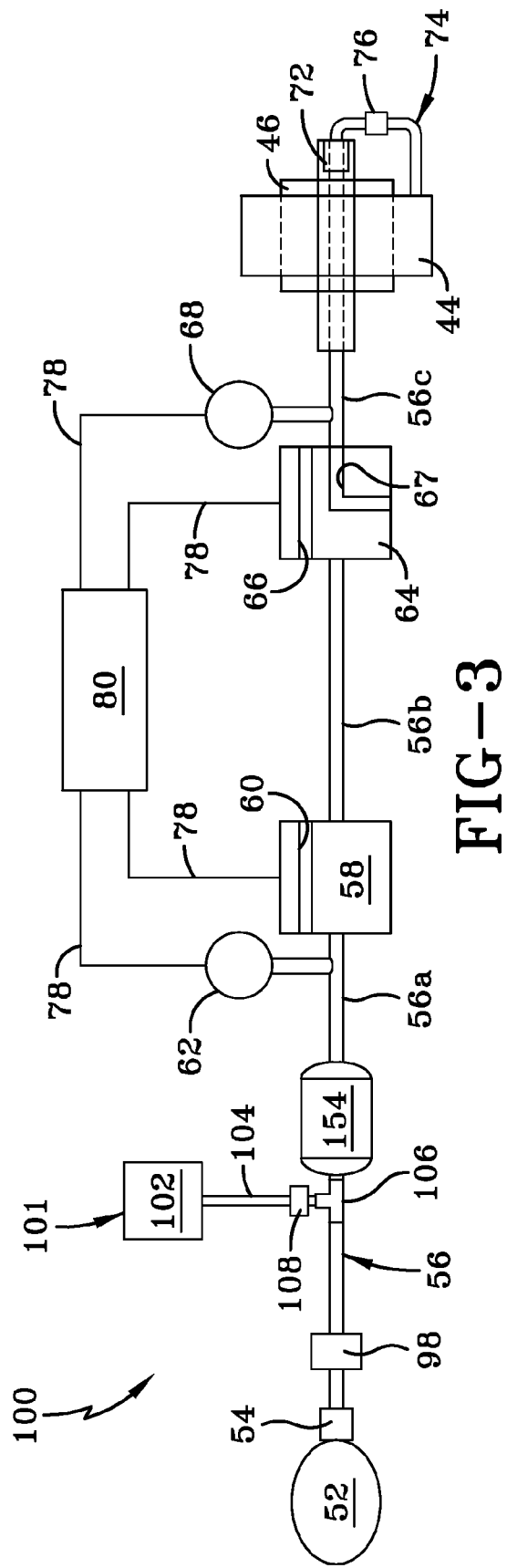
FIG. 3 is a schematic diagram of the main components of a first exemplary embodiment of the tire inflation system with parallel pump of the present invention.

Turning now to FIG. 3, a first exemplary embodiment of the tire inflation system with parallel pump of the present invention is indicated generally at 100. The general construction of first embodiment tire inflation system 100 of the present invention is similar to prior art electronically-regulated tire inflation system 50 (FIG. 2), with the exception that the first embodiment tire inflation system of the present invention includes a separate or parallel pump. More particularly, tire inflation system 100 includes a pump 101, which is located separate from and operates independently of supply tank 52. In first embodiment tire inflation system 100, pump 101 preferably is an electrically-driven pump 102, such as an electric compressor. Electric compressor 102 is connected to pneumatic conduit 56 of tire inflation system via a separate pneumatic conduit 104, which connects to the tire inflation system pneumatic conduit at a tee fitting 106.

Preferably, the activation and deactivation of electric compressor 102 is controlled by a pressure switch 103 (FIG. 4) that is integrated into the compressor, which will enable the compressor to respond to a pressure requirement or demand, as will be described in greater detail below. In this manner, electric compressor 102 intakes air from atmosphere, compresses it to a predetermined pressure, and sends the compressed air via pneumatic conduit 104 to tire inflation system pneumatic conduit 56, thereby increasing the air pressure of tire inflation system 100 from a source that is separate from and parallel to supply tank 52.

It is to be understood that rotary union 72, as known in the art, provides a transition for tire inflation system components from the relatively static environment upstream of the rotary union, to a dynamic environment downstream of the rotary union, which is caused by the rotation of tire 44 and wheel 46 as the vehicle is traveling. As a result, tee fitting 106 preferably connects to pneumatic conduit 56 in the static environment upstream of rotary union 72. A check valve 108 preferably is disposed in pneumatic conduit 104 between electric compressor 102 and tee fitting 106, or at the tee fitting, so that the compressor only introduces air into pneumatic conduit 56 when demanded by a pressure requirement.

More specifically, as mentioned above, in vehicles that are used in certain geographic areas, such as the U.S., vehicle supply tank 52 optimally is charged with compressed air to about 120 psi or about 8.3 bar. In vehicles that are used in certain other geographic areas, such as Europe, the maximum pressure level of supply tank 52 is often set by government regulations at about 100 psi or about 7 bar, and to ensure compliance with such regulations, the supply tank is often charged by vehicle operators to a lower level, such as about 90 psi or just over 6 bar. However, certain tires, such as some tires used on heavy-duty vehicles in Europe, require an inflation pressure of at least 130 psi or about 9 bar.

Figure 4:
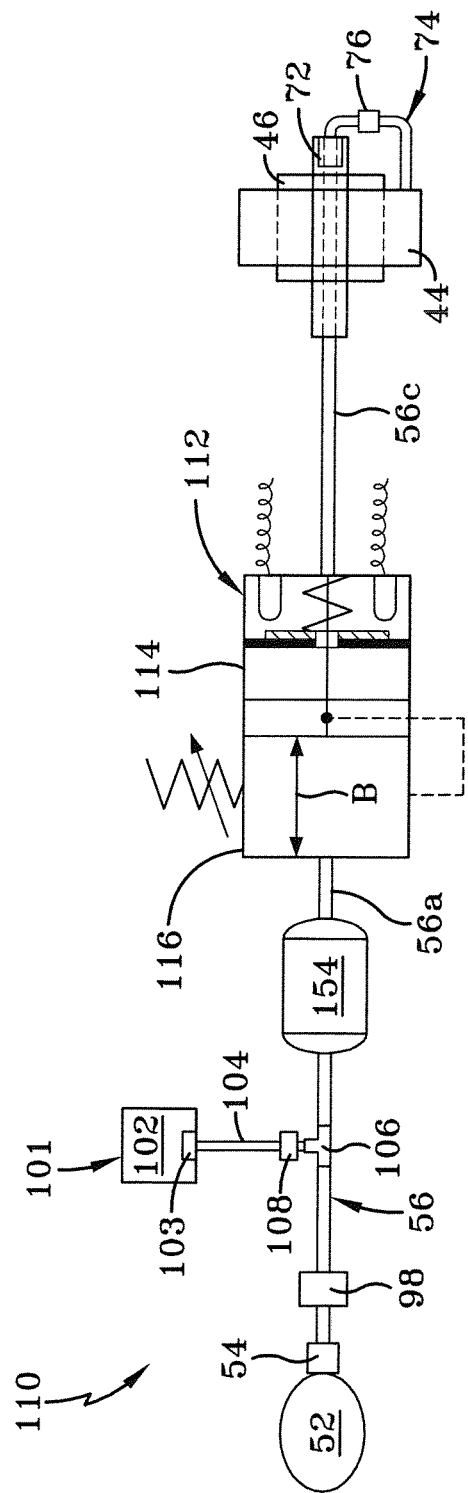
FIG. 4 is a schematic diagram of the main components of a second exemplary embodiment of the tire inflation system with parallel pump of the present invention.

In first embodiment tire inflation system 100 of the present invention, electric compressor 102 includes an integrated pressure switch 103 (FIG. 4). If the pressure in conduit 104 drops below a predetermined level, such as below about 135 psi or about 9.3 bar, pressure switch 103 reads this drop and activates electric compressor 102. Electric compressor 102 remains activated, compressing air from atmosphere, until a maximum predetermined pressure level is reached. For example, when pressure switch reads a pressure in pneumatic conduit 104 of about 140-150 psi, or about 9.7-10.3 bar, pressure switch 103 causes compressor 102 to deactivate. Electric compressor 102 thus compresses air from atmosphere and charges pneumatic conduit 104 to the required pressure level. Check valve 108 controls the flow of air from electric compressor 102 into pneumatic conduit 56, thereby ensuring that the necessary air passes from the compressor through tee fitting 106 and into tire inflation system pneumatic conduit 56, and does not flow back toward the compressor.

Preferably, a secondary check valve 98 is disposed between vehicle supply tank 52 and tee fitting 106, to ensure that pneumatic pressure from electric compressor 102 does not flow into the vehicle supply tank. Optionally, a reservoir tank 154 may be fluidly connected to pneumatic conduit 56, so that electric compressor 102 compresses air from atmosphere and fills the reservoir tank. Reservoir tank 154 in turn is fluidly connected to tire inflation system 100 to provide the required air pressure to the system. It is to be understood that reservoir tank 154 is separate from vehicle supply tank 52 and is fluidly connected to pneumatic conduit 56 separate from the vehicle supply tank.

With this construction and arrangement, first embodiment tire inflation system with parallel pump 100 of the present invention increases the pressure of the tire inflation system, while operating separate from and independently of vehicle supply tank 52. First embodiment tire inflation system 100 supplies air from an air path that is parallel to the path from vehicle supply tank 52 to tires 44, to supplement the pressure from the vehicle air supply to reach the required pressure level.

With reference now to FIG. 4, a second exemplary embodiment of the tire inflation system with parallel pump of the present invention is indicated generally at 110. Second embodiment tire inflation system with parallel pump 110 is generally similar in structure and operation to first embodiment tire inflation system with parallel pump 100, with the exception that the second embodiment tire inflation system is shown and described as a mechanically-regulated system, while the first embodiment tire inflation system is shown and described as an electronically-regulated system.

More particularly, second embodiment tire inflation system with parallel pump 110 employs a mechanically-operated valve 112, rather than electrical components such as solenoid valves 58, 64, transducers 62, 68 and controller 80 (FIG. 3). Valve 112 is a pressure-sensitive valve, and generally is simpler and more economical to employ than solenoid valves 58, 64.

It is to be understood that valve 112 may be any mechanically-operated valve known to those skilled in the art which is suitable for controlling air flow in pneumatic conduit 56. For example, valve 112, which is schematically shown, preferably includes a regulator 116. When the air pressure in third pneumatic conduit section 56c, which extends between valve 112 and tire 44, drops below a predetermined level, regulator 116 opens the valve, as known to those skilled in the art. Once valve 112 is open, air is delivered from first pneumatic conduit section 56a to third pneumatic conduit section 56c, until the desired air pressure in the third pneumatic conduit section is reached. Once the desired pressure is reached, regulator 116 closes valve 112. Valve 112 may optionally include a flow switch 114, which detects an air flow leak, as known in the art. By using valve 112, second pneumatic conduit section 56b (FIG. 3), solenoid valves 58, 64, transducers 62, 68 and controller 80 are eliminated, resulting in a more cost-effective and simpler arrangement for second embodiment tire inflation system 110 when compared to first embodiment tire inflation system 100.

As with first embodiment tire inflation system 100, second embodiment tire inflation system 110 includes pump 101, which is located separate from and operates independently of supply tank 52. Pump 101 preferably is an electric compressor 102 and is connected to tire inflation system pneumatic conduit 56 via separate pneumatic conduit 104, which connects to the tire inflation system pneumatic conduit at tee fitting 106. Check valve 108 preferably is disposed in pneumatic conduit 104 between compressor 102 and tee fitting 106, or at the tee fitting, to control air flow so that the compressor only introduces air into pneumatic conduit 56 when demanded by a pressure requirement.

As described above, the activation and deactivation of electric compressor 102 is controlled by a pressure switch 103 that is integrated into the compressor, and enables the compressor to respond to a pressure requirement or demand. In this manner, compressor 102 intakes air from atmosphere, compresses it to a predetermined pressure, and sends the compressed air via pneumatic conduit 104 to tire inflation system pneumatic conduit 56, thereby increasing the air pressure of tire inflation system 110 from a source that is separate from and parallel to supply tank 52. As with first embodiment tire inflation system with parallel pump 100, second embodiment tire inflation system with parallel pump 110 optionally includes reservoir tank 154, so that compressor 102 compresses air from atmosphere and fills the reservoir tank, which in turn provides the required air pressure to the system.

Figure 5:
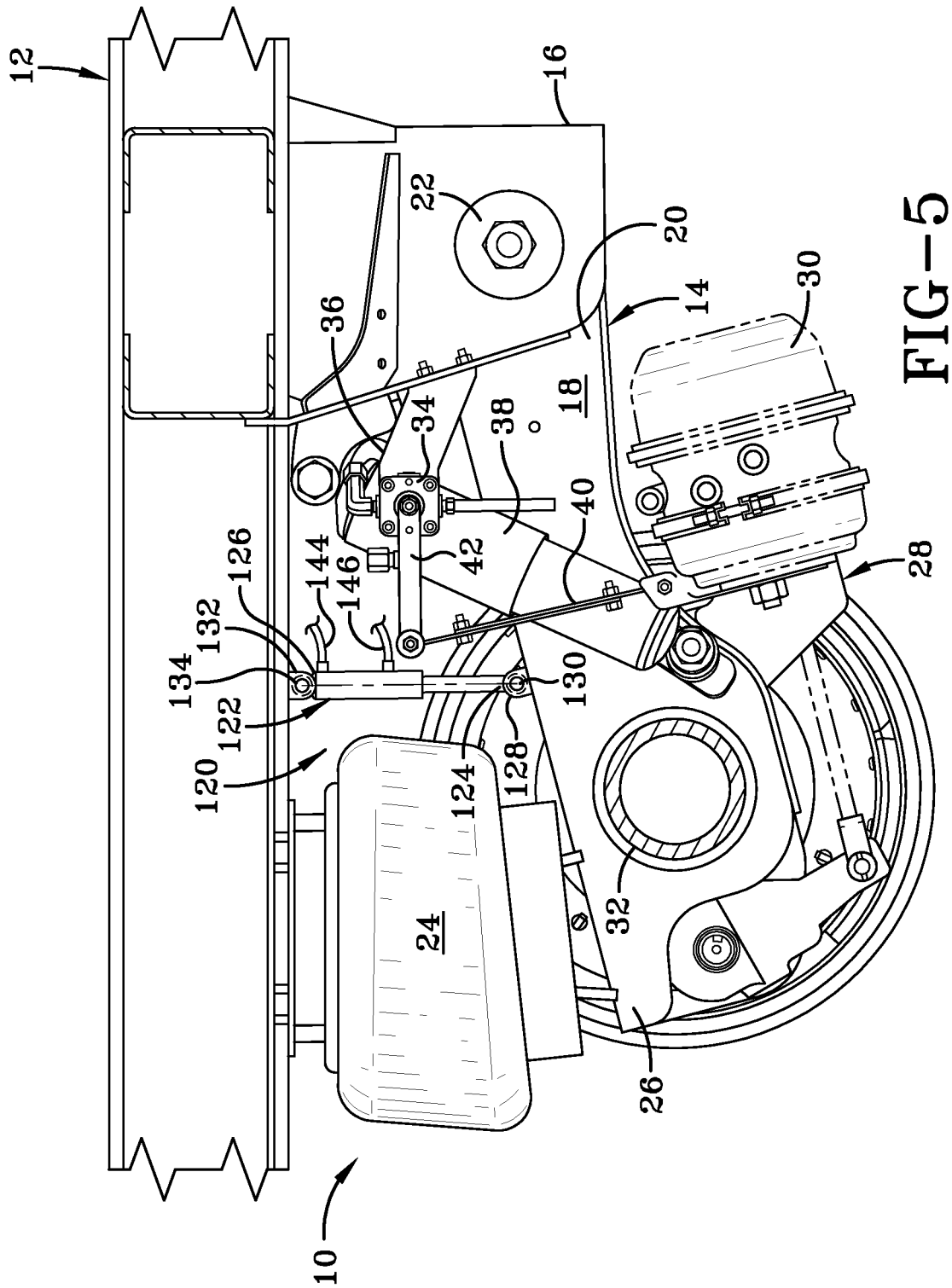
FIG. 5 is a fragmentary side elevational view, with portions in section, of a pump of a third exemplary embodiment of the tire inflation system with parallel pump of the present invention mounted on a suspension assembly and an axle of an air-ride trailing arm beam-type axle/suspension system.
Figure 6:
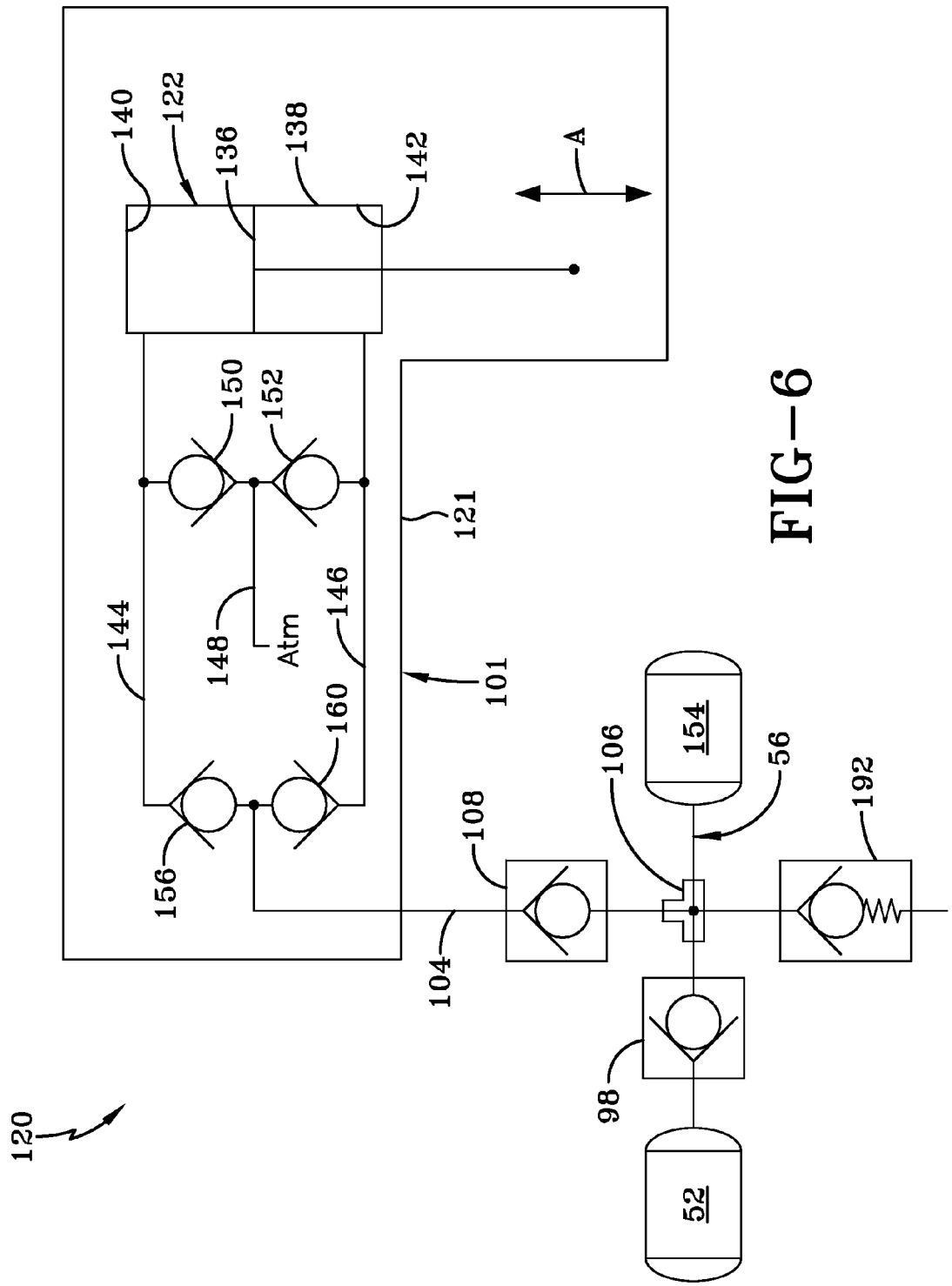
FIG. 6 is a schematic diagram of the pneumatic configuration of the third exemplary embodiment of the tire inflation system with parallel pump of the present invention.

Turning now to FIGS. 5 and 6, a third exemplary embodiment of the tire inflation system with parallel pump of the present invention is indicated generally at 120. Third embodiment tire inflation system 120 is shown as a mechanically-regulated system, as is second embodiment tire inflation system 110, and is generally similar in construction and operation to the second embodiment tire inflation system, with the exception that pump 101 of the third embodiment tire inflation system includes an articulation-activated pumping assembly 121 rather than electric compressor 102. It is to be understood that third embodiment tire inflation system 120 finds use with any known mechanically-regulated, electronically-regulated, or pneumatically-regulated tire inflation system.

Pumping assembly 121 includes a mechanical pump 122, which preferably is mounted on axle/suspension system 10, thereby enabling the articulation of the axle/suspension system to compress air for tire inflation system 120. More particularly, and with specific reference to FIG. 5, mechanical pump 122 includes a lower end 124 that is attached to beam 18 and an upper end 126 that is attached to vehicle frame 12. Mechanical pump 122 is pivotally connected to beam 18 and frame 12 to maintain a generally uniform orientation, shown in FIG. 5 as a vertical orientation, which provides optimum pumping performance as axle/suspension system 10 articulates during vehicle operation. To facilitate this pivotal connection, a lower bracket 128 is rigidly affixed to beam 18, such as by welding, and a pin 130 pivotally connects pump lower end 124 to the lower bracket. Likewise, an upper bracket 132 is rigidly affixed to frame 12, such as by welding, and a pin 134 pivotally connects pump upper end 126 to the upper bracket.

Mechanical pump 122 preferably is a double-acting, reciprocating-cylinder type pump, which enables the pump to compress air upon vertical articulation or movement of axle/suspension system 10 and thus of beam 18 relative to vehicle frame 12. With additional reference now to FIG. 6, mechanical pump 122 includes a piston 136 disposed in a cylinder 138, which defines an upper chamber 140 in the cylinder above the piston, and a lower chamber 142 in the cylinder below the piston. Upward and downward movement of piston 136 is indicated by arrow A. When beam 18 moves upwardly, the attachment of mechanical pump 122 to the beam and to frame 12 causes the pump to compress, which moves piston 136 upwardly. The upward movement of piston 136 compresses the volume of air in upper chamber 140 and forces the compressed air out of an upper conduit 144, which is fluidly connected to the upper chamber. The movement of piston 136 upwardly also expands the volume of lower chamber 142, creating suction in the lower chamber. This suction draws air into lower chamber 142 from atmosphere through a vent conduit 148 and through a lower conduit 146, which is fluidly connected to the lower chamber.

When beam 18 moves downwardly, the attachment of mechanical pump 122 to the beam and to frame 12 causes the pump to expand, which moves piston 136 downwardly. The downward movement of piston 136 compresses the volume of air in lower chamber 142 and forces the compressed air out of lower conduit 146. The movement of piston 136 downwardly also expands the volume of upper chamber 140, creating suction in the upper chamber, which draws air into the upper chamber from atmosphere, indicated by 'Atm' in FIG. 6, through vent conduit 148 and through upper conduit 144.

To facilitate the intake of air from atmosphere into upper and lower chambers 140, 142, respectively, an upper vent check valve 150 is located between vent conduit 148 and upper conduit 144, and a lower vent check valve 152 is located between the vent conduit and lower conduit 146. Thus, when suction is created in upper chamber 140, upper vent check valve 150 enables air to be drawn in through vent conduit 148 from atmosphere, pass through the upper vent check valve, and enter upper conduit 144 and the upper chamber. Likewise, when suction is created in lower chamber 142, lower vent check valve 152 enables air to be drawn in through vent conduit 148 from atmosphere, pass through the lower vent check valve, and enter lower conduit 146 and the lower chamber.

When mechanical pump 122 compresses air, the compressed air is delivered to reservoir 154, which is separate from vehicle supply tank 52. More particularly, when air in upper chamber 140 is compressed by upward movement of piston 136, the compressed air flows through upper conduit 144, is blocked from flowing to atmosphere by upper vent check valve 150, passes through an upper reservoir check valve 156, and out of pumping assembly 121. The compressed air then continues through conduit 104, check valve 108, tee fitting 106, tire inflation system pneumatic conduit 56, and into reservoir 154. Upper reservoir check valve 156 and check valve 108 enable compressed air to flow into reservoir 154, while isolating upper conduit 144 from the reservoir. This isolation allows sufficient pressure to build in upper conduit 144 to overcome the pressure in reservoir 154, thereby consistently increasing the pneumatic pressure in the reservoir.

Likewise, when air in lower chamber 142 is compressed by downward movement of piston 136, the compressed air flows through lower conduit 146, is blocked from flowing to atmosphere by lower vent check valve 152, passes through a lower reservoir check valve 160, and out of pumping assembly 121. The compressed air continues through conduit 104, check valve 108, tee fitting 106, tire inflation system pneumatic conduit 56, and into reservoir 154. Lower reservoir check valve 160 and check valve 108 enable compressed air to flow into reservoir 154, while isolating lower conduit 146 from the reservoir.

Secondary check valve 98 is disposed between vehicle supply tank 52 and reservoir 154 to ensure that pneumatic pressure from pump 122 does not flow into the vehicle supply tank. In addition, a relief valve 192 preferably is connected to tire inflation system conduit 56 to enable the conduit to vent to atmosphere in the event that excessive pressure is encountered. In this manner, mechanical pump 122 of pumping assembly 121 compresses air from atmosphere and sends it to reservoir 154, which in turn sends it through pneumatic conduit 56.

With this construction and arrangement, third embodiment tire inflation system with parallel pump 120 of the present invention increases the pressure to the tire inflation system to deliver the required inflation pressure to tires 44, while operating separate from and independently of vehicle supply tank 52. Third embodiment tire inflation system 120 supplies air from an air path that is parallel to the path from vehicle supply tank 52 to tires 44, to supplement the pressure from the vehicle air supply to reach the required pressure level.

Third embodiment tire inflation system 120 finds particular advantage in situations where cost and/or mechanical structure are important considerations. For example, the use of mechanical pump 122 of pumping assembly 121, which converts mechanical motion into compressed air potential, alleviates the need for electrical power or electric pumps, and thereby lowers the cost of the system. In addition, mechanical pump 122 of pumping assembly 121 is simpler in construction than electric pumps and has only one major moving component, piston 136, so that the need to service and/or replace components of third embodiment tire inflation system 120 is desirably decreased.

It is to be understood that mechanical pump 122 may optionally be integrated into an existing axle/suspension system component, such as shock absorber 36 or air spring 24. With any such integration, particular adaptations to the configuration of mechanical pump 122 may be made in order to enable the compression of air by upward and/or downward movement of shock absorber 36 or air spring 24, respectively, as axle/suspension system 10 articulates, without affecting the overall concept or operation of the present invention. Additionally, mechanical pump 122 or a component into which it is integrated, such as shock absorber 36 or air spring 24, may be pre-charged with pneumatic pressure to a predetermined level. Such pre-charging provides an additional intensity to the compression action of mechanical pump 122, thereby increasing the air provided by the pump and pumping assembly 121.

Figure 7:
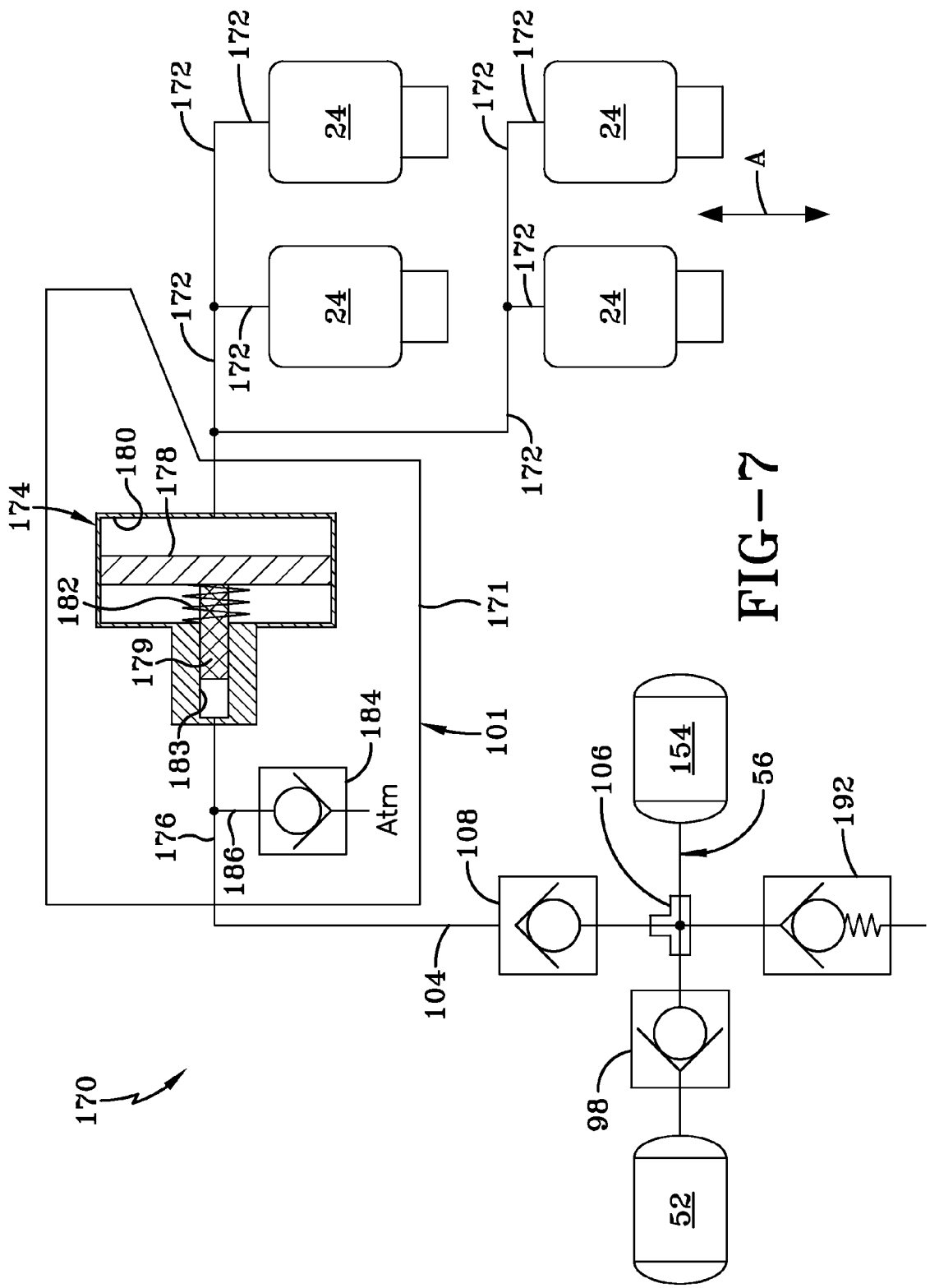
FIG. 7 is a schematic diagram of the pneumatic configuration of a fourth exemplary embodiment of the tire inflation system with parallel pump of the present invention.

Turning now to FIG. 7, a fourth exemplary embodiment of the tire inflation system with parallel pump of the present invention is indicated generally at 170. Fourth embodiment tire inflation system 170 is shown as a mechanically-regulated system, as are second and third embodiment tire inflation systems 110, 120, respectively, and is generally similar in construction and operation to the second and third embodiment tire inflation systems, with the exception that pump 101 of the fourth embodiment tire inflation system includes a pumping assembly 171 that harnesses air spring pressure spikes. Because it harnesses air spring pressure spikes, fourth embodiment tire inflation system 170 finds particular application on air-ride axle/suspension systems. It is to be understood that fourth embodiment tire inflation system 170 finds use with any known mechanically-regulated, electronically-regulated, or pneumatically-regulated tire inflation system.

As is known in the art, height control valve 34 (FIG. 1) causes air springs 24 to be filled with compressed air from vehicle supply tank 52 in response to increased load conditions of the heavy-duty vehicle, such as the vehicle trailer being loaded with freight. As the vehicle travels over-the-road, it typically encounters bumps and/or other obstacles which cause beam 18 (FIG. 1) of axle/suspension system 10 to move upwardly, which in turn compresses air springs 24. When air springs 24 compress, the pressure within each air spring correspondingly increases, which is referred to in the art as an air spring pressure spike. Fourth embodiment tire inflation system 170 of the present invention harnesses air spring pressure spikes to increase the pressure that is available to inflate tires 44. The articulation of axle/suspension system 10 that creates compression in air springs 24 is indicated by arrow A in FIG. 7.

More particularly, each air spring 24 is connected via a pneumatic conduit 172 to a pumping assembly 171, which includes a mechanical pump 174. Pump 174 preferably is a spring-biased mechanical pump that acts to control and intensify the pressure level between conduit 172 from air springs 24 and a pneumatic conduit 176 leading from the pump to conduit 104 and reservoir 154. More specifically, pump 174 defines an air spring inlet chamber 180 and an outlet chamber 183. A vent conduit 186 enables air to be drawn in from atmosphere, indicated by 'Atm' in FIG. 7, past a vent check valve 184 and into outlet chamber 183. A piston 178 is disposed in inlet chamber 180 and is operatively connected to a shaft 179. Shaft 179 extends from piston 178 into outlet chamber 183 and receives a spring 182, which is captured between the piston and a wall of pump 174. When air springs 24 experience a pressure spike, the excess air pressure from the spike flows through conduit 172 to pump inlet chamber 180, which actuates piston 178 by overcoming the bias of spring 182. When piston 178 is actuated, shaft 179 compresses the volume of air from atmosphere in outlet chamber 183, thereby intensifying the pneumatic energy that is transmitted to inlet chamber 180. In this manner, pump 174 captures the air from air spring pressure spikes, and piston 178 and shaft 179 act to intensify the energy from these spikes, and the pump uses this energy to compress and transmit air to reservoir tank 154. Since vent conduit 186 enables air to be drawn in from atmosphere past vent check valve 184 and into pump 174, after compressed air passes from the pump into pneumatic conduit 176, the bias of spring 182 exceeds the pressure in chamber 180, thereby enabling the spring to move piston 178 back to its original position.

When compressed air passes out of pump 174, the air is delivered to reservoir 154, which is separate from vehicle supply tank 52. More particularly, the compressed air flows from pump 174 through pneumatic conduit 176, is blocked from flowing to atmosphere by vent check valve 184, and passes out of pumping assembly 171. The compressed air continues flowing through pneumatic conduit 104, check valve 108, tee fitting 106, tire inflation system pneumatic conduit 56, and into reservoir 154. Check valve 108 enables compressed air to flow into reservoir 154, while isolating pneumatic conduits 104 and 176 from the reservoir, which allows sufficient pressure to build in the conduits to overcome the pressure in the reservoir and consistently increase the pneumatic pressure in the reservoir.

Secondary check valve 98 is disposed between vehicle supply tank 52 and reservoir 154 to ensure that pneumatic pressure from pump 174 does not flow into the vehicle supply tank. In addition, a relief valve 192 preferably is connected to tire inflation system pneumatic conduit 56 to enable the conduit to vent to atmosphere in the event that excessive pressure is encountered.

In this manner, air spring air pressure spikes are harnessed by pump 174 of pumping assembly 171 to compress air and transmit the air to reservoir 154, which in turn enables the air to flow through pneumatic conduit 56. With this construction and arrangement, fourth embodiment tire inflation system with parallel pump 170 of the present invention increases the pressure of the tire inflation system to deliver the required inflation pressure to tires 44, while operating separate from and independently of vehicle supply tank 52. Fourth embodiment tire inflation system 170 supplies air from an air path that is parallel to the path from vehicle supply tank 52 to tires 44, to supplement the pressure from the vehicle air supply to reach the required pressure level.

Optionally, in the event that air spring pressure spikes are too transient to actuate piston 178, an additional air spring may be added to fourth embodiment tire inflation system 170. This additional air spring is dedicated to capturing pressure spikes, and thus of a sufficient size and shape to intensify pressure spikes in order to make them easier for capture in pump 174. Moreover, the additional air spring may be pre-charged with pneumatic pressure to a predetermined level, which provides an additional intensity to any pressure spikes. Thus, when the pre-charged air spring experiences a pressure spike, the spike is higher than that of air springs 24, so that it is easier for pump 174 to capture the spike.

Figure 8:
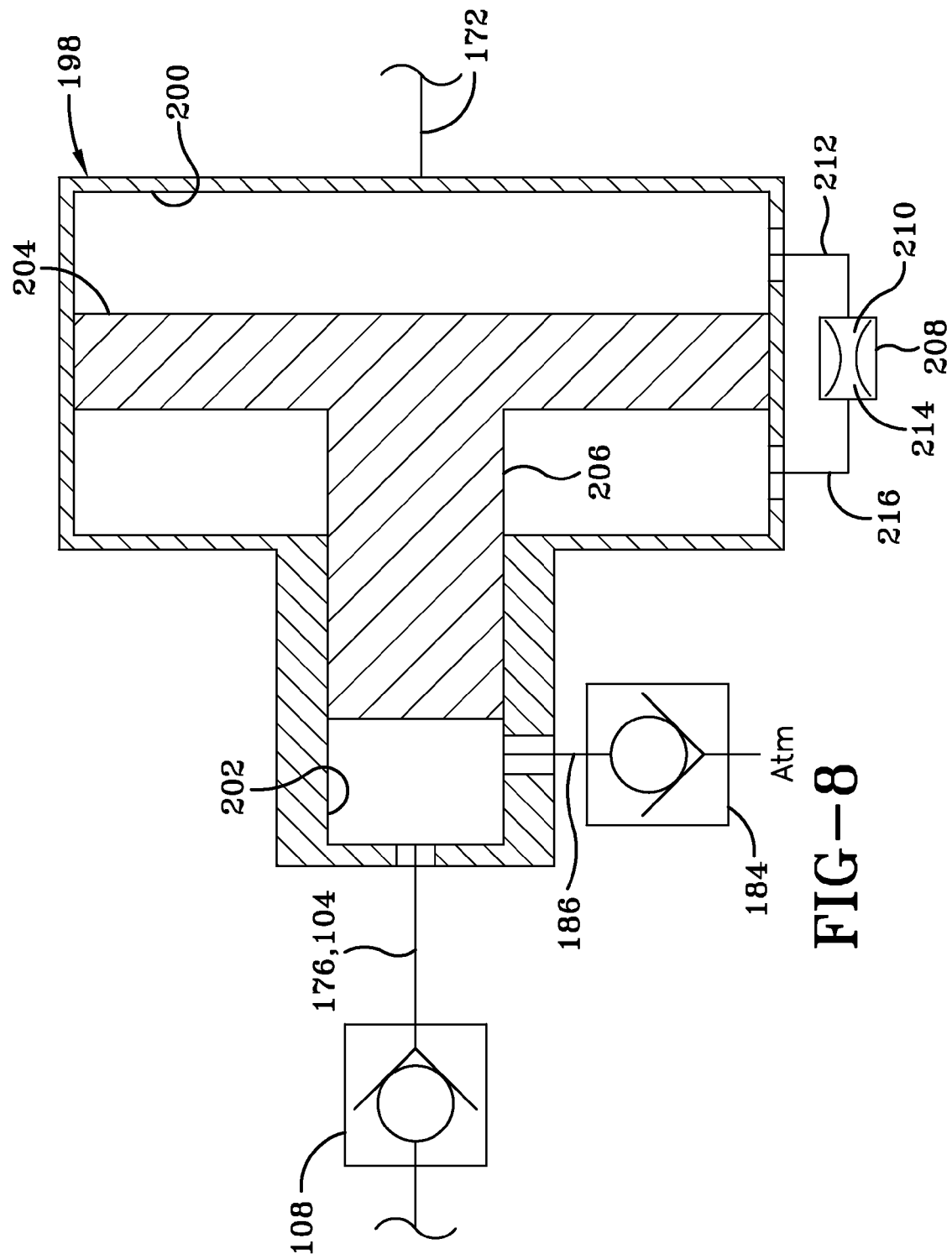
FIG. 8 is an alternative embodiment of a pump for use in the tire inflation system shown in FIG. 7.

With reference to FIG. 8, fourth embodiment tire inflation system 170 may alternatively employ other configurations for pump 174, such as pump 198. Pump 198 defines an inlet chamber 200 and an outlet chamber 202. A piston 204 is disposed in inlet chamber 200 and is operatively connected to a shaft 206, which extends from the piston into outlet chamber 202. An external orifice 208 enables the pressure in pump 198 to equalize on both sides of piston 204. More particularly, a first end 210 of orifice 208 is fluidly connected to inlet chamber 200 on one side of piston 204 via conduit 212, while a second end 214 of the orifice is fluidly connected to the inlet chamber on the other side of the piston via conduit 216. The use of orifice 208 provides an equalizing action that enables pump 198 to function over a wider range of pressures within air springs 24 than pump 174. For example, dynamic movement of axle/suspension system 10 may cause pressure fluctuations on the inlet side of piston 204 that may not have time to equalize with the pressure on the outlet side of the piston. Orifice 208 provides a regulated interconnection between both sides of piston 204, which enables the pressure to equalize on both sides of piston 204, which in turn enables pump 198 to function when air springs 24 are at high pressures, such as when the vehicle is loaded with freight, and at low pressures, such as when the vehicle is not loaded with freight.

Alternatively, to provide an equalizing action that enables pump 174, 198 to operate when air springs 24 are at high pressures and at low pressures, the pump may be of a double-acting, reciprocating design, as known in art. For example, using pump 198 by way of illustration, the pump may optionally include a second piston that is connected to shaft 206 in outlet chamber 202. The second piston cooperates with piston 204 to enable pump 198 to compress air when shaft 206 moves in either direction, thereby providing a greater operating range for the pump.

Fourth embodiment of tire inflation system 170 finds particular advantage in situations where cost and/or mechanical structure are important considerations, since the harnessing of air spring pressure spikes alleviates the need for electrical power or electric pumps, thereby lowering the cost of the system. In addition, the use of mechanical pump 174, 198 of pumping assembly 171, which is simpler in construction than electric pumps, decreases the need to service and/or replace associated components.

In this manner, tire inflation system with parallel pump embodiments 100, 110, 120, 170 of the present invention each provide a tire inflation system with a pump 101 that is pneumatically separate from and parallel to vehicle air supply 52, rather than being pneumatically in-line with the vehicle air supply. Such a pneumatically parallel pump 101, including electric compressor 102 and mechanical pumps 122, 174, 198, is able to operate independently from vehicle air supply 52. This independent operation enables pump 101 to provide air to each respective tire inflation system 100, 110, 120, 170 in the event that components associated with vehicle supply tank 52 malfunction. In addition, pump 101 enables vehicle supply tank 52 to provide a continuing supply of air to tire inflation system 100, 110, 120, 170 in the case of malfunction of the pump. Moreover, tire inflation system 100, 110, 120, 170 provides easy servicing and/or replacement of components of pump 101, and easy bypassing of the pump, in the event that such a bypass is needed.

Third and fourth embodiments of tire inflation system 120, 170 include pumping assemblies 121, 171, respectively, which each utilize a mechanical pump 122, 174, 198 and/or air spring pressure spikes, thereby alleviating the need for electrical power or electric pumps, and thus are relatively inexpensive and mechanically advantageous. In addition, since third and fourth embodiments of tire inflation system 120, 170 include pumping assemblies 121, 171 that employ mechanical pumps 122, 174, 198, which are simpler in construction than electric pumps, the need to service and/or replace associated components is decreased.

Optionally, pump 101 may include a radial turbine to drive an impeller/compressor similar to an automobile turbocharger. More particularly, and by way of example, pump 101 may include a radial turbine that is driven by air from air supply tank 52. The radial turbine converts the air pressure from air supply tank 52 to rotational force, which in turn actuates or drives an impeller or compressor. The pump draws in and compresses air from atmosphere, as described above.

As pump 101 is driven by the radial turbine, the pump compresses the air and sends the compressed air to reservoir tank 154 and/or pneumatic conduit 56 at an increased pressure.

The present invention also includes a method for increasing an air pressure in a pneumatic conduit of a vehicle tire inflation system using a pump that is independent of the vehicle air supply source. The method includes steps in accordance with the description that is presented above and shown in FIGS. 3-8.

It is to be understood that electric compressor 102 and mechanical pumps 122, 174, 198 of pump 101 are described above by way of example, as the pump of the tire inflation system of the present invention 100, 110, 120, 170 may include any pump known to those skilled in the art that takes in air from atmosphere, including electric pumps, mechanical pumps, and air-driven pumps, such as air-spring driven pumps and supply-air driven pumps, including piston-style and other-style pumps known to those skilled in the art, without affecting the overall concept or operation of the invention. It is to be understood that the structure of the above-described tire inflation system with parallel pump of the present invention 100, 110, 120, 170 may be altered or rearranged, or certain components omitted or added, without affecting the overall concept or operation of the invention. For example, electric compressors 102 may be used on electrically, mechanically, or pneumatically regulated systems, and mechanical pumps 122, 174, 198 may be used on electrically, mechanically, or pneumatically regulated systems. It is to be further understood that the present invention finds application in types of heavy-duty vehicle frames, heavy-duty vehicle axle/suspension systems and tire inflation systems therefor, other than those shown and described herein and which are known to those skilled in the art, without affecting the concept or operation of the invention.

Accordingly, the improved tire inflation system with parallel pump is simplified, provides an effective, safe, inexpensive, and efficient structure which achieves all the enumerated objectives, provides for eliminating difficulties encountered with prior art tire inflation systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved tire inflation system with parallel pump is constructed, arranged and used, the characteristics of the construction and arrangement, and the advantageous, new and useful results obtained; the new and useful structures, devices, elements, arrangements, parts and combinations are set forth in the appended claims.

What is claimed is:
1. A vehicle tire inflation system, comprising:
an air supply source in fluid communication with a tire of said vehicle, said air supply source providing an air pressure to said tire at a first air pressure level;

a pneumatic conduit extending between and being in fluid communication with said air supply source and said tire;

a pump including an inlet and an outlet, said inlet receiving air from atmosphere, said pump compressing said air, and said outlet being in fluid communication with said pneumatic conduit independent of said air supply source; and means for actuating said pump to supplement said air pressure in said pneumatic conduit and increase the air pressure to a required second pressure level that is greater than said first air pressure level provided by said air supply source.

2. The vehicle tire inflation system of claim 1, wherein said pump operates independently of said air supply source.

3. The vehicle tire inflation system of claim 1, wherein said pump is electrically driven.

4. The vehicle tire inflation system of claim 3, wherein said pump includes an electric compressor.

5. The vehicle tire inflation system of claim 3, wherein said means for actuating said pump includes a pressure switch.

6. The vehicle tire inflation system of claim 1, wherein said pump is mounted on an axle/suspension system of said vehicle, and said means for actuating said pump includes said articulating axle/suspension system.

7. The vehicle tire inflation system of claim 6, wherein said pump is a double-acting pump.

8. The vehicle tire inflation system of claim 6, wherein said pump is integrated into a shock absorber or an air spring component of said axle/suspension system.

9. The vehicle tire inflation system of claim 6, wherein said pump is pre-charged with pneumatic pressure to a predetermined level.

10. The vehicle tire inflation system of claim 1, wherein said means for actuating said pump includes at least one air spring of an axle/suspension system of said vehicle supplying air.

11. The vehicle tire inflation system of claim 10, wherein said pump is a mechanical pump.

12. The vehicle tire inflation system of claim 10, wherein said means for actuating said pump includes said at least one air spring supplying air from air pressure spikes in the air spring, which are harnessed by the pump.

13. The vehicle tire inflation system of claim 12, wherein said pump includes an orifice for equalizing air pressure within the pump.

14. The vehicle tire inflation system of claim 12, wherein said pump is a double-acting pump.

15. The vehicle tire inflation system of claim 1, further comprising a check valve in fluid communication with said pneumatic conduit and said pump.

16. The vehicle tire inflation system of claim 1, further comprising a reservoir tank in fluid communication with said pump and said pneumatic conduit, said reservoir tank being independent of said air supply source.

17. The vehicle tire inflation system of claim 1, further comprising at least one electrically-operated valve disposed in said pneumatic conduit to control air flow in the pneumatic conduit.

18. The vehicle tire inflation system of claim 1, further comprising at least one mechanically-operated valve disposed in said pneumatic conduit to control air flow in the pneumatic conduit.

19. The vehicle tire inflation system of claim 1, wherein said pump is mechanically driven.

20. The vehicle tire inflation system of claim 1, wherein said pump is air driven.

21. The vehicle tire inflation system of claim 20, wherein said pump is an air-spring driven pump.

22. The vehicle tire inflation system of claim 20, wherein said pump is a supply-air driven pump.

23. The vehicle tire inflation system of claim 22, wherein said pump includes a radial turbine.

24. The vehicle tire inflation system of claim 22, wherein said pump is a piston-style pump.

25. A vehicle tire inflation system, comprising:

an air supply source in fluid communication with a tire of said vehicle;

a pneumatic conduit extending between and being in fluid communication with said air supply source and said tire;

a pump including an inlet and an outlet, said inlet receiving air from atmosphere, said pump compressing said air, and said outlet being in fluid communication with said pneumatic conduit independent of said air supply source;

a reservoir tank in fluid communication with said pump and said pneumatic conduit, said reservoir tank being independent of said air supply source; and means for actuating said pump to increase an air pressure in said pneumatic conduit above an air pressure provided by said air supply source.

26. A vehicle tire inflation system, comprising:

an air supply tank in fluid communication with a tire of said vehicle, said air supply tank being charged with compressed air by a first pump and providing an air pressure to said tire at a first air pressure level;

a pneumatic conduit extending between and being in fluid communication with said air supply tank and said tire;

a second pump including an inlet and an outlet, said inlet receiving air from atmosphere, said second pump compressing said air, and said outlet being in fluid communication with said pneumatic conduit independent of said air supply tank; and means for actuating said second pump to supplement said air pressure in said pneumatic conduit and increase the air pressure to a second pressure level that is greater than said first air pressure level provided by said air supply tank.

* * * * *